United States Patent
Kusano

(10) Patent No.: US 9,621,685 B2
(45) Date of Patent: Apr. 11, 2017

(54) ARCHITECTURE FOR AN ACCESS NETWORK SYSTEM MANAGEMENT PROTOCOL CONTROL UNDER HETEROGENEOUS NETWORK MANAGEMENT ENVIRONMENT

(71) Applicant: Oliver Solutions Ltd., Herzliya (IL)

(72) Inventor: Toshihiko Kusano, Kawasaki (JP)

(73) Assignee: Oliver Solutions Ltd., Herzliya (IL)

( * ) Notice: Subject to any disclaimer, the term of this patent is extended or adjusted under 35 U.S.C. 154(b) by 154 days.

(21) Appl. No.: 14/256,011

(22) Filed: Apr. 18, 2014

(65) Prior Publication Data

US 2014/0314087 A1    Oct. 23, 2014

Related U.S. Application Data

(63) Continuation-in-part of application No. PCT/IL2013/050947, filed on Nov. 14, 2013.
(Continued)

(51) Int. Cl.
*H04L 29/06* (2006.01)
*H04L 12/715* (2013.01)
(Continued)

(52) U.S. Cl.
CPC .............. *H04L 69/18* (2013.01); *H04L 45/52* (2013.01); *H04L 45/64* (2013.01); *H04L 45/745* (2013.01); *H04L 69/08* (2013.01)

(58) Field of Classification Search
None
See application file for complete search history.

(56) References Cited

U.S. PATENT DOCUMENTS 5,613,100 A    3/1997 Anezaki
5,740,374 A *  4/1998 Raffali-Schreinemachers .... H04L 69/08
                                                        370/360
(Continued)

FOREIGN PATENT DOCUMENTS

EP    1241828 A1    9/2002

OTHER PUBLICATIONS

Etheridge et al., "Distributed architecture for cross-domain network management", IEEE, Network Operations and Management Symposium, vol. 2, pp. 610-618, New York, NY, Feb. 15, 1998.
(Continued)

*Primary Examiner* — Brandon Renner
*Assistant Examiner* — Jay Vogel
(74) *Attorney, Agent, or Firm* — Soquel Group LLC

(57) ABSTRACT

A method for processing messages within a telecommunication network, including receiving, by a central office (CO) from a network manager, a message packaged within a first data frame, the message conforming to a first protocol and being addressed to a customer premises equipment (CPE), wherein the CO communicates with the network manager using the first protocol, and communicates with the CPE using a second protocol, determining if the CPE to which the message is addressed supports the first protocol, when the determining is affirmative, then encapsulating the message conforming to the first protocol within a second data frame confirming to the second protocol, when the determining is not affirmative, then translating the message from the first protocol to the second protocol, and packaging the translated message within a second data frame confirming to the second protocol, and sending the second data frame to the CPE using the second protocol.

6 Claims, 11 Drawing Sheets

Related U.S. Application Data

(60) Provisional application No. 61/814,314, filed on Apr. 21, 2013.

(51) Int. Cl.
*H04L 12/741* (2013.01)
*H04L 12/781* (2013.01)

(56) References Cited

U.S. PATENT DOCUMENTS

| | | | |
|---|---|---|---|
| 6,957,346 B1 * | 10/2005 | Kivinen | H04L 12/4633 713/153 |
| 7,379,451 B1 * | 5/2008 | Brebner | H04L 12/4633 370/356 |
| 2003/0084219 A1 * | 5/2003 | Yao | H04L 29/06 710/300 |
| 2010/0104288 A1 * | 4/2010 | Zheng | H04J 3/1617 398/67 |
| 2011/0113142 A1 * | 5/2011 | Rangegowda | H04L 29/12971 709/227 |
| 2012/0011233 A1 * | 1/2012 | Dixon | H04L 12/2827 709/221 |
| 2014/0115154 A1 | 4/2014 | Mack-Crane et al. | |
| 2014/0233564 A1 * | 8/2014 | Lue | H04L 45/50 370/392 |

OTHER PUBLICATIONS

European Patent Application No. 14 166 230.4, Search Report and Search Opinion, Nov. 6, 2014, 7 pages.

* cited by examiner

400

| CPE ID | MANAGEMENT PACKAGE TYPE | MANAGEMENT PROTOCOL FORWARDING RULE |
|---|---|---|
| 1-1 | A | FORWARD PROTOCOL A |
| 1-2 | B | TRANSLATE PROTOCOL A TO PROTOCOL B |
| 1-3 | AB | ENCAPSULATE PROTOCOL A IN PROTOCOL B |
| ... | ... | ... |

ARCHITECTURE FOR AN ACCESS NETWORK SYSTEM MANAGEMENT PROTOCOL CONTROL UNDER HETEROGENEOUS NETWORK MANAGEMENT ENVIRONMENT

CROSS REFERENCE TO RELATED APPLICATIONS

This application claims priority benefit of U.S. Provisional Application No. 61/814,314, filed on Apr. 21, 2013 by inventor Toshihiko Kusano.

This application is a continuation-in-part of PCT Application No. PCT/IL2013/050947 entitled TELECOMMUNICATION NETWORK NODE SUPPORTING HYBRID MANAGEMENT USING A HARDWARE ABSTRACTION AND MANAGEMENT PROTOCOL CROSS-CONNECT FUNCTION, filed on Nov. 14, 2013 by inventor Toshihiko Kusano.

FIELD OF THE INVENTION

The present invention relates to telecommunication networks, and in particular to networks that are managed heterogeneously using more than one management protocol.

BACKGROUND OF THE INVENTION

Recently, software defined networking (SDN) has been recognized as a next generation network management system for packetized data communication. SDN includes a control plane, i.e., a system that makes decisions about where traffic is sent, and a data plane, i.e., a system that forwards traffic to its destination. Network devices reside in the data plane, and interface with the control plane through a control plane/data plane interface. SDN manages network devices through abstraction of lower level functionality by decoupling the control plane from the data plane. SDN enables network administrators to have programmable central control of network traffic without requiring physical access to the network's switches. SDN creates a logical network control plane where a network switch can forward packets and a separate server can run the network control plane. The decoupling allows for the control plane to be implemented using a different distribution model than the data plane.

Telecommunication operators are interested in adopting SDN, and the Open Networking Foundation (ONF) has standardized a protocol, OPENFLOW™, for communication between the control plane and the data plane. During the upgrade from existing management systems to SDN-based management systems, both management systems will co-exist.

Conventional telecommunication network nodes are configured to work with a designated management system using a designated protocol. Different management protocols are based on different distribution models, and telecommunication network nodes that operate in accordance with one distribution model generally exhibit anomalous behavior if they are managed in accordance with another distribution model.

As such, upgrading an existing management system to an SDN-based management system requires replacement of all deployed telecommunication nodes with nodes adapted to SDN-based management; i.e., replacement of an entire network. Such replacement is enormously expensive and time-consuming, and causes disruption of service. For access network systems, the upgrade requires replacement of entire customer premises equipment (CPE).

Thus it would be of advantage to find an efficient way to operate existing telecommunication network nodes in accordance with heterogeneous management systems.

SUMMARY OF THE DESCRIPTION

Embodiments of the present invention provide efficient ways to operate telecommunication network nodes in accordance with a heterogeneous management environment. Aspects of the present invention enable telecommunication network nodes to interoperate with an existing management protocol and with other protocols, including inter alia a control plane/data plane interface for supporting SDN.

The present invention is of particular advantage for access networks, by enabling continuous use of CPEs while upgrading a management system. Otherwise, without the present invention, operators would need to replace CPE's located at customer sites, which is a major undertaking and which entails disruption of service. In distinction, the present invention enables operators to upgrade a management system seamlessly, without having to upgrade CPEs.

Embodiments of the present invention relate to access networks that are managed by management computers that employ different management protocols. The networks include telecommunication nodes that have a central office (CO) computer that serves as the node's access point to the network, and that have one or more CPE computers connected to the CO computer by physical data links. The CO and CPE computers in the node include hardware resources that are controlled via respective hardware resource APIs. The CO computer receives messages from and sends messages to the management computers over an access network, and receives messages from and sends messages to the CPE computers over physical data links. The messages may be request messages sent by management computers to the CO computer or to the CPE computers, or reply messages sent by the CO computer or by the CPE computers to the management computers. The messages may also be autonomous messages sent by the CO computer or by the CPE computers to the management computers, notifying the management computers of events or changes of state. Each message is packaged in a data frame that conforms to an appropriate protocol.

In order to accommodate heterogeneous management, a CO computer must be able to receive, from a management computer over the access network, a control request message using a first protocol and being addressed to one of the CPE computers in the node, and to forward the control request message to its destination CPE computer over a physical data link using a second protocol. The CO computer identifies the protocol capabilities of the destination CPE computer, and employs a translator to translate the request message from the first protocol to the second protocol, or employs an encapsulator to encapsulate the request message within a data frame conforming to the second protocol, as appropriate, based on the protocol capabilities of the CPE computer.

There is thus provided in accordance with an embodiment of the present invention a method for processing messages within a telecommunication network, including receiving, by a central office (CO) computer within a telecommunication node from a network manager computer, a message packaged within a first data frame, the message conforming to a first protocol and being addressed to a customer premises equipment (CPE) computer within the telecommunication node, wherein the CO computer communicates with the network manager computer via an access network using the first protocol, and communicates with the CPE computer via a physical data link using a second protocol, determining, by the CO computer, whether or not the CPE computer to which the message is addressed supports the first protocol, when the determining is affirmative, then encapsulating, by the CO computer, the message conforming to the first protocol within a second data frame that conforms to the second protocol, when the determining is not affirmative, then translating, by the CO computer, the message from the first protocol to the second protocol, and packaging the translated message within a second data frame that conforms to the second protocol, and sending, by the CO computer, the second data frame to the CPE computer using the second protocol via the physical data link.

There is additionally provided in accordance with an embodiment of the present invention a central office (CO) computer within a telecommunication network node, including a connection with an access network for sending messages to and receiving messages from a network manager computer using a first protocol, the messages being packaged within data frames, a connection with a physical data link for sending messages to and receiving messages from one or more customer premises equipment (CPE) computers within the telecommunication network node using a second protocol, the messages being packaged within data frames, a translator that is operative to translate messages bi-directionally between the two protocols, an encapsulator that is operative (i) to encapsulate a message contained in a data frame conforming with the first protocol, and package the encapsulated message within a data frame conforming to the second protocol, and (ii) to decapsulate a message conforming with the first protocol from a data frame conforming to the second protocol, and package the decapsulated message within a data frame conforming to the first protocol, and a message parser that is operative (i) to parse a message received from the network manager computer over the access network, the message being addressed to one of the CPE computers within the telecommunication node and being packaged within a first data frame conforming to the first protocol, (ii) to determine whether or not the CPE computer to which the message is addressed supports the first protocol, (iii) to pass the message to the encapsulator for encapsulating the message within a second data frame conforming to the second protocol, when the determining is affirmative, and (iv) to pass the message to the translator for translating the message from the first protocol to the second protocol, and package the translated message within a second data frame conforming to the second protocol, when the determining is not affirmative.

There is further provided in accordance with an embodiment of the present invention a customer premises equipment (CPE) computer within a telecommunication network node, including a connection with a hardware resource that provides a physical data link for sending messages to and receiving messages from a network management computer, via a central office (CO) computer within the telecommunication network node, the messages being packaged within data frames using a first protocol when sending to and receiving from the network management computer, an encapsulator that is operative (i) to encapsulate a message contained in a data frame conforming with the first protocol, and package the encapsulated message within a data frame conforming to the second protocol, and (ii) to decapsulate a message conforming with the first protocol from a data frame conforming to the second protocol, and a message parser that is operative (i) to parse a message received from the network manager computer, the message being packaged within a data frame conforming to the second protocol, (ii) to determine whether or not the data frame includes encapsulated data conforming to the first protocol, and (iii) to conditionally pass the data frame to the encapsulator for decapsulating the encapsulated data, when the determining is affirmative.

BRIEF DESCRIPTION OF THE DRAWINGS

The present invention will be more fully understood and appreciated from the following detailed description, taken in conjunction with the drawings in which:

FIG. 5 is a simplified illustration of the CPE management protocol control table of FIG. 4, in accordance with an embodiment of the present invention;

DETAILED DESCRIPTION

Aspects of the present invention relate to communication networks of nodes that are under control of two different management systems. In one embodiment, the nodes are central office (CO) computers that control customer premises equipment (CPE) computers. The present invention is of particular advantage for upgrading existing systems to SDN-based systems, since it obviates the need to replace an entire existing physical infrastructure of CPEs.

In the discussion herein, a CO computer and a CPE computer are referred to simply as a "CO" and a "CPE", respectively.

Figure 1:
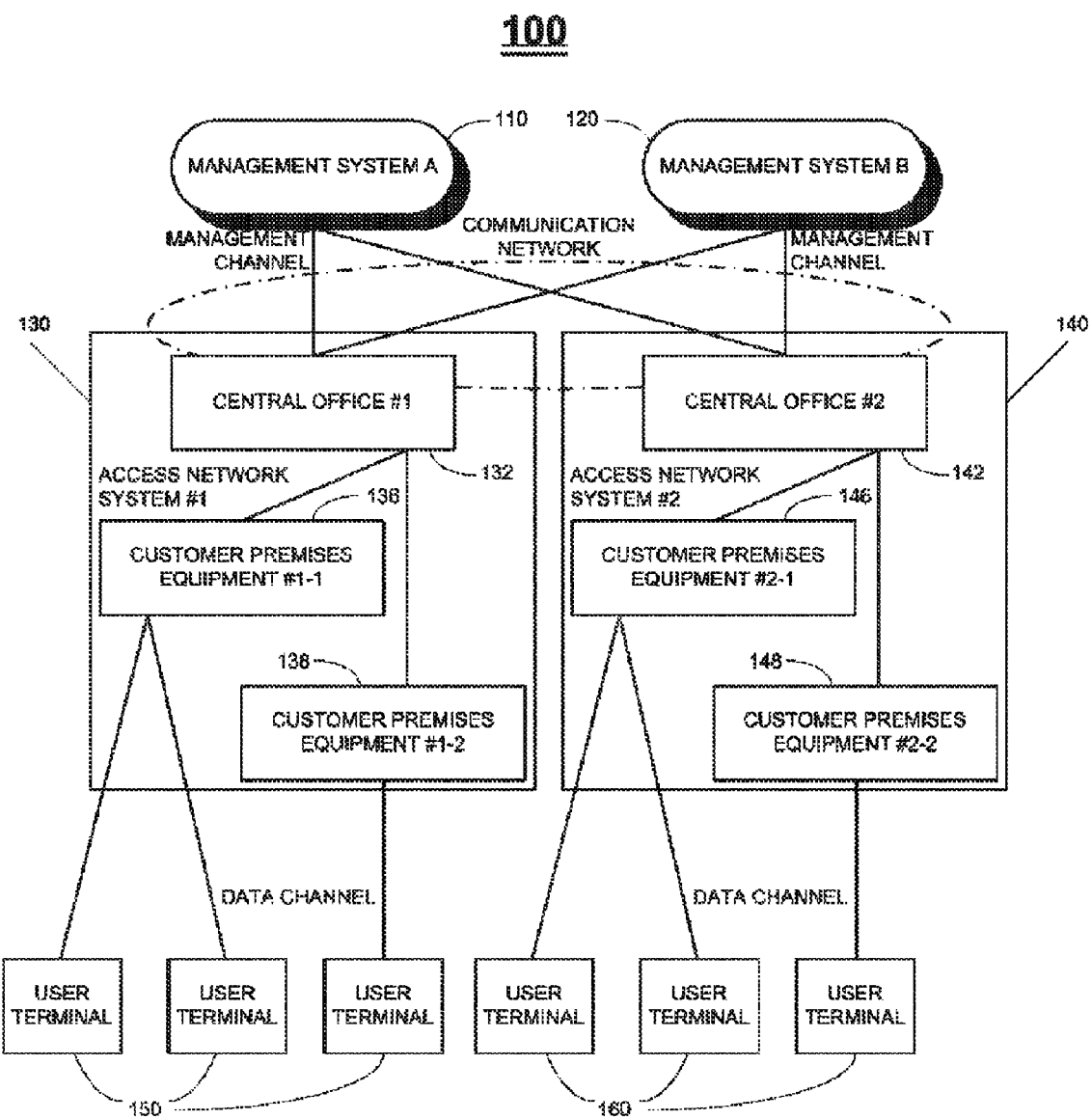
FIG. 1 is a simplified block diagram of a telecommunication network system configured for heterogeneous management, in accordance with an embodiment of the present invention.

Reference is made to FIG. 1, which is a simplified block diagram of a telecommunication network system 100 configured for heterogeneous management, in accordance with an embodiment of the present invention. Generally, network system 100 is controlled by one or more management systems, which establish data channels, configure data forwarding rules, and operate and administer the network system. Network system 100 includes one or more telecommunication nodes. Each node includes a central office (CO) and one or more CPEs. The CO serves as an access point for the node to a communication network between the management system(s) and the nodes. The CO in the node receives requests in the form of management control messages from the management system(s). Requests may be intended for the CO or for one of the CPEs in the node. If a request is intended for a CPE in the node, then the CO forwards the request to the CPE. Generally, each CO and CPE controls one or more hardware resources, and the management control messages are implemented via APIs for the hardware resources. In response-request type network systems, a CO or CPE that receives a request sends a reply back to the management system that issued the request.

FIG. 1 shows two management systems, designated 110 and 120, and referred to as management system A and management system B, respectively, which communicate with each of two telecommunication nodes, designated 130 and 140. Management system 110 and/or 120 may use a standard resource management protocol, such as OPEN FLOW™, or a non-standard protocol. The protocol used by management system 110 is designated as "protocol A", and the protocol used by management system 120 is designated as "protocol B". Telecommunication nodes 130 and 140 communicate with management systems 110 and 120 over management channels. Telecommunication node 130 connects with user terminals 150 over data channels, and telecommunication node 140 connects with user terminals 160 over data channels. Telecommunication nodes 130 and 140 are managed by management systems 110 and 120, to establish data channels, to configure data forwarding rules, and for general administration and operation. Telecommunication nodes 130 and 140 communicate with management systems 110 and 120 via specific management interfaces, and management messages are communicated using protocol A and protocol B, respectively.

Telecommunication node 130 includes a central office (CO), designated 132, and referred to as CO #1, and two customer premises equipment (CPE), designated 136 and 138, and referred to as CPE #1-1 and CPE #1-2, respectively. Telecommunication node 140 includes a central office, designated 142, and referred to as CO #2, and two CPEs, designated 146 and 148, and referred to as CPE #2-1 and CPE #2-2, respectively.

CO 132 communicates with CPEs 136 and 138 over physical data links using specific management protocols. Similarly, CO 142 communicates with CPEs 146 and 148 using specific management protocols. Generally, when a CPE is registered in a telecommunications network, it exchanges information to notify the network of the protocol that it uses. For example, IEEE 802.3ah/av and ITU-T G.983.2 each define a message exchange mechanism to notify the network of organization information specific to a CPE in a passive optical network.

It will be appreciated by those skilled in the art that the system shown in FIG. 1 is an exemplary system for the purpose of explaining embodiments of the network management functionality of the subject invention. As such, although FIG. 1 shows two management systems communicating with two telecommunication nodes each having a CO and two CPEs, the subject invention applies to any configuration of management systems, telecommunication nodes, COs and CPEs.

The network of FIG. 1 may be, inter alia, a passive optical network (PON), and the CPEs may be optical network units (ONUs).

Figure 2:
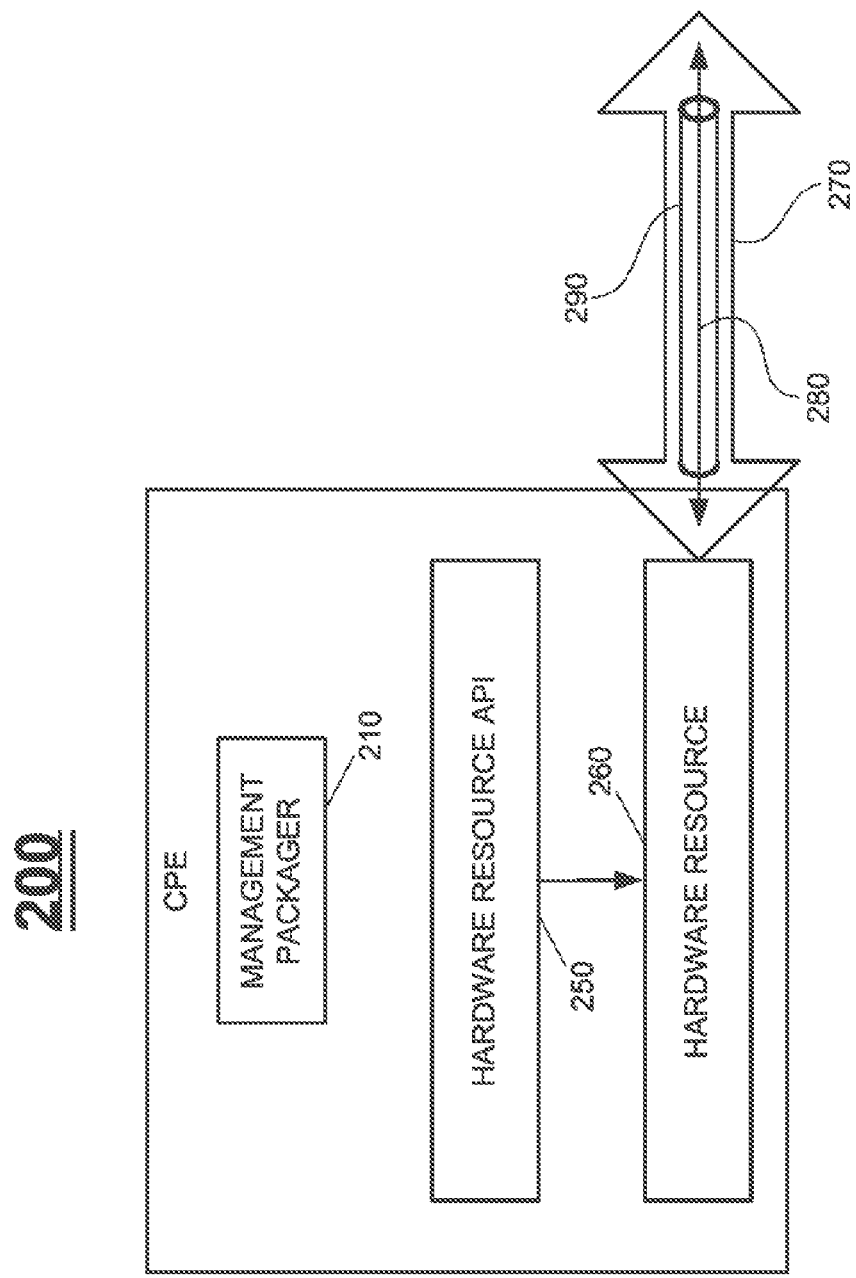
FIG. 2 is a simplified block diagram of customer premises equipment (CPE), in accordance with an embodiment of the present invention.

Reference is made to FIG. 2, which is a simplified block diagram of a CPE 200, such as CPE #1-1, CPE #1-2, CPE #2-1 or CPE #2-2 of FIG. 1, in accordance with an embodiment of the present invention. CPE 200 includes a management packager 210, a hardware resource API 250, and a hardware resource 260. Management packager 210 processes control messages received from a CO.

Hardware resource 260 provides a physical data link 270 for communication between CPE 200 and a CO via a CPE management protocol 280. Data link 270 uses a logical CPE management protocol channel 290.

Figure 3:
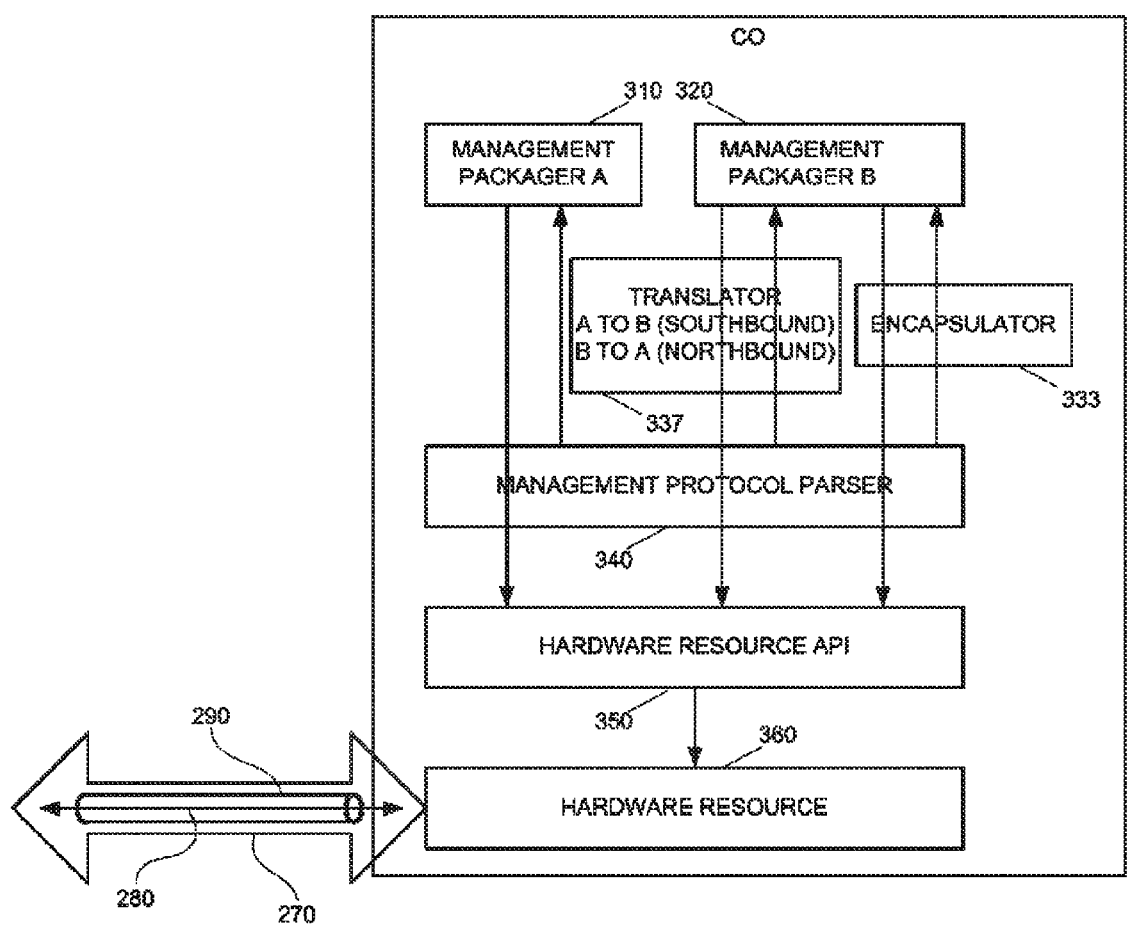
FIG. 3 is a simplified block diagram of a central office (CO), with two management packagers, that uses a management control parser, in accordance with an embodiment of the present invention.

Reference is made to FIG. 3, which is a simplified block diagram of a CO 300, such as CO #1 or CO #2 of FIG. 1, with two management packagers 310 and 320, that uses a management control protocol parser 340, in accordance with an embodiment of the present invention. Management packagers 310 and 320 are referred to as management packager A and management packager B, respectively. Management packagers 310 and 320 process control messages received from management systems, such as management systems 110 and 120 of FIG. 1. CO 300 includes an encapsulator 333, a translator 337, and management protocol parser 340, the operations of which are described below. CO 300 includes a hardware resource API 350, and a hardware resource 360.

CO 300 communicates with CPEs over data link 270 via CPE management protocol 280. Data link 270 uses logical CPE management protocol channel 290.

Figure 4:
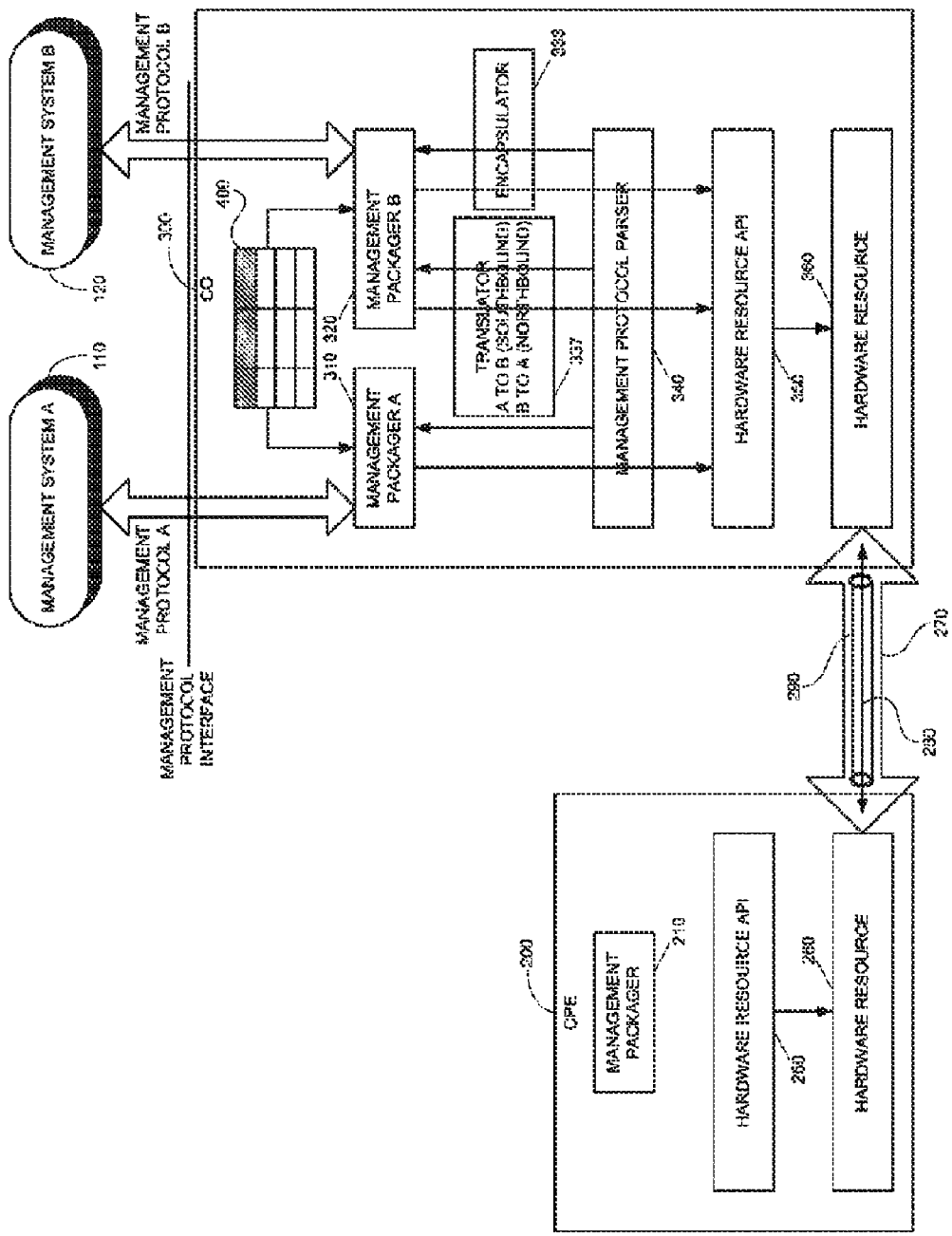
FIG. 4 is a simplified block diagram of a system, incorporating the CPE FIG. 2 and the CO of FIG. 3, that uses a CPE management protocol control table, in accordance with an embodiment of the present invention.

Reference is made to FIG. 4, which is a simplified block diagram of a system, incorporating CPE 200 of FIG. 2 and CO 300 of FIG. 3, that uses a CPE management protocol control table 400, in accordance with an embodiment of the present. Generally, a CPE supports a single management packager, whereas a CO may support more than one management packager, such as management packagers 310 and 320. However, in some cases a CPE may also support more than one management packager, such as CPE 600 shown in FIG. 9, which is discussed below.

FIG. 4 shows that management control messages are forwarded from CO 300 to hardware resource 260, using physical data link 270 between CO 300 and CPE 200, through logical CPE management protocol channel 290.

FIG. 4 shows that management packagers A and B access CPE management protocol control table 400 in order to process management control messages that they receive from management systems 110 and 120.

Reference is made to FIG. 5, which is a simplified illustration of the CPE management protocol control table 400 of FIG. 4, in accordance with an embodiment of the present invention. Control table 400 includes a field 410 with a CPE identifier, a field 420 with a management package type, and a field 430 with a management protocol forwarding rule.

Processing Requests

Figure 6:
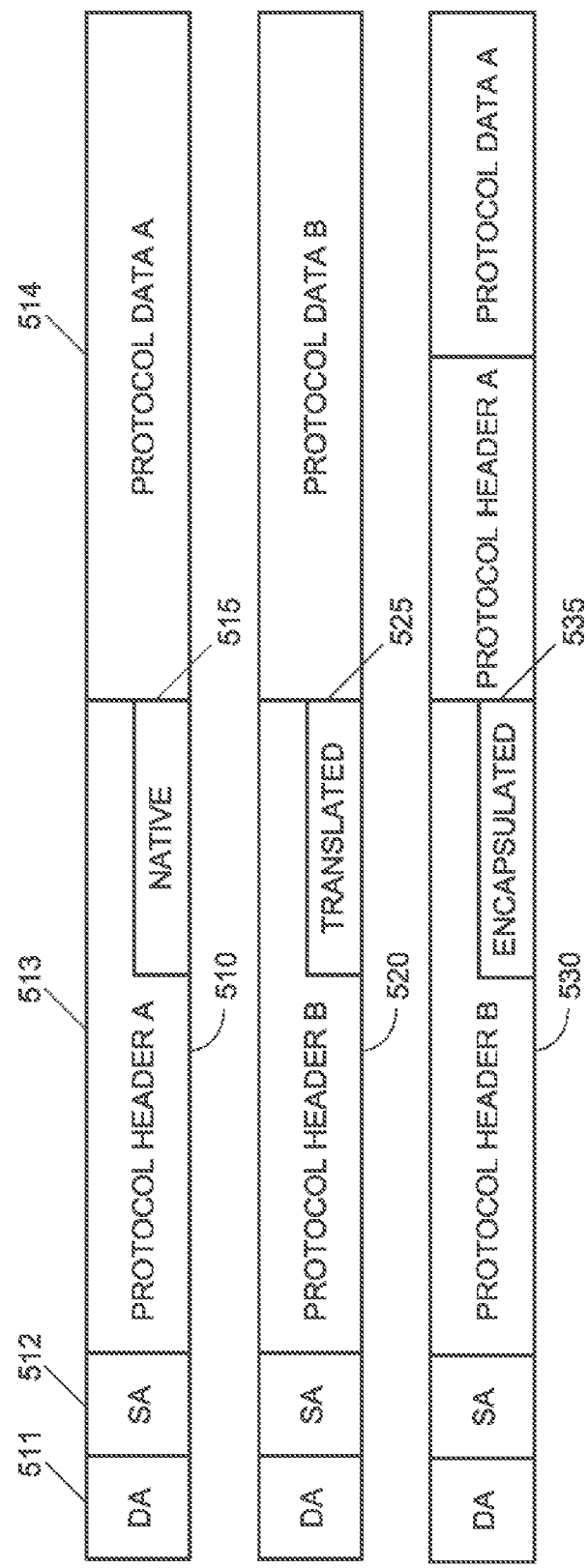
FIG. 6 is a simplified illustration of three exemplary data frames for management control messages, in accordance with an embodiment of the present invention.

Reference is made to FIG. 6, which is a simplified illustration of three exemplary data frames for packaging management control messages, in accordance with an embodiment of the present invention. A first data frame 510 includes a destination address 511, a source address 512, a protocol A header 513, protocol A data 514 and a flag 515. A second data frame 520 includes a protocol B header, protocol B data and a flag 525. A third data frame 530 includes a protocol B header, a protocol A header, protocol A data and a flag 535. The flags 515, 525 and 535 have respective settings referred to as "NATIVE", "TRANSLATED" and "ENCAPSULATED". Use of these flags is described below.

When a management packager in a CO receives a message from one of the heterogeneous management systems, it first determines if the message is being sent to the CO itself, to control the CO, or if instead the message is being sent to a CPE via the CO. If the message is being sent to a CPE via the CO, then the management packager invokes a procedure that uses a method with special rule-based logic for forwarding messages.

Figure 7:
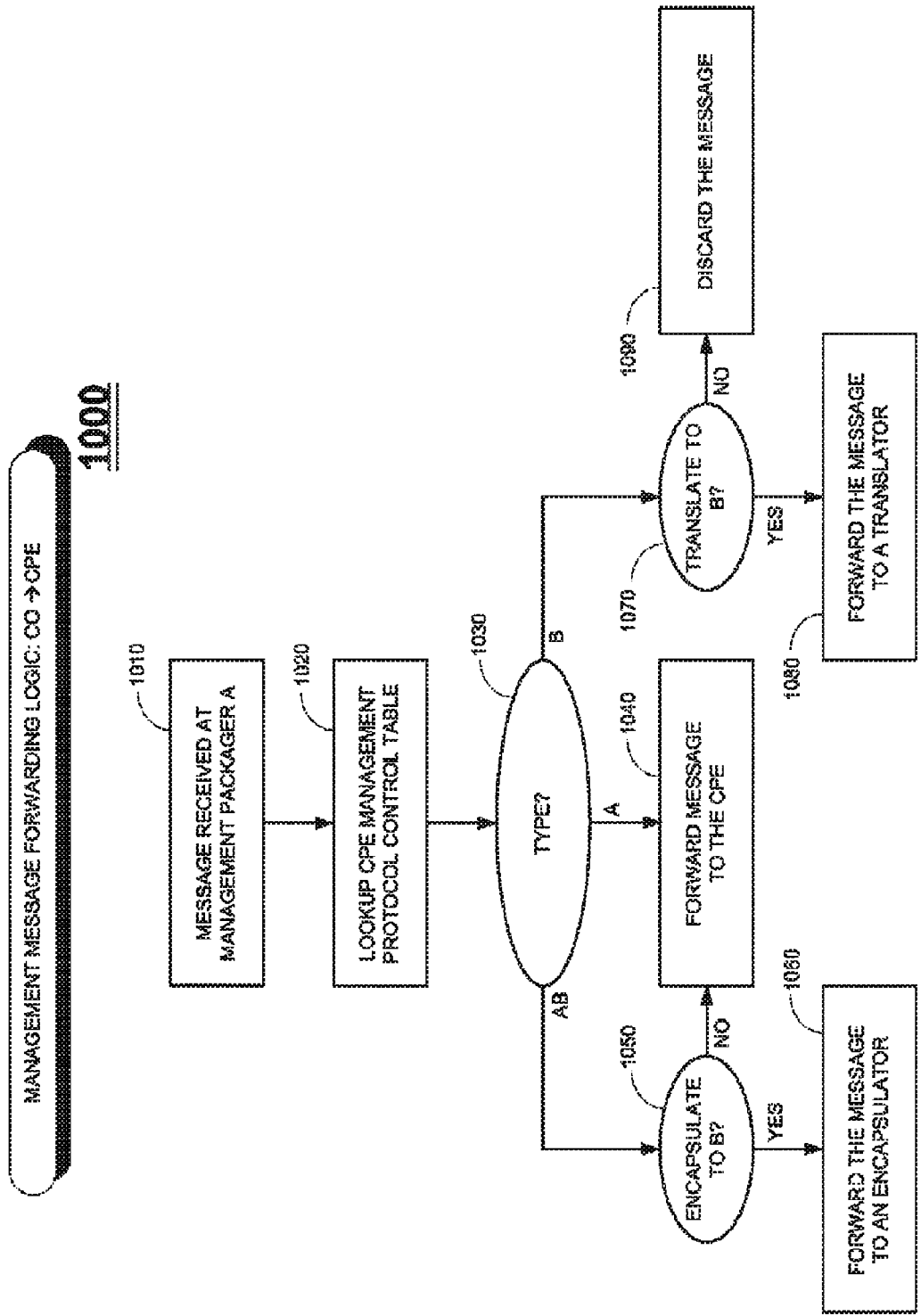
FIG. 7 is a simplified flowchart of a method used by a CO to forward management control messages received from management systems to their intended CPEs, in accordance with an embodiment of the present invention.

Reference is made to FIG. 7, which is a simplified flowchart of a method 1000 used by CO 300 to forward management control messages received from management system 110 to their destination CPEs, in accordance with an embodiment of the present invention. The method of FIG. 7 includes separate branches for destination CPEs of type A, type B and type AB, as determined from CPE management protocol control table 400. It will be appreciated by those skilled in the art that the relevant flowchart for forwarding management control messages received from management system 120 is similar to that of FIG. 7, but with "A" and "B" reversed at the middle branch and right branch from operation 1030, and with "B" replaced by "A" at operations 1050 and 1070.

When management packager 310 in CO 300 receives a message from management system A for destination CPEs of type A, CO 300 forwards the message to the CPE, preserving the protocol in use. When management packager 310 in CO 300 receives a message from management system A for destination CPEs of type B, the protocol is translated from protocol A to protocol B by a translator (element 337 of FIG. 4), and the translated message is then forwarded to the destination CPE. When management packager 310 in CO 300 receives a message from management system A for destination CPEs of type AB, CO 300 encapsulates protocol A in protocol B by an encapsulator (element 333 of FIG. 4), and the encapsulated message is then forwarded to the destination CPE. The thus-processed protocol is forwarded to a hardware resource (element 260 of FIG. 4), using a physical data link (element 270 of FIG. 4) between the CO and the CPE through a logical CPE management protocol channel (element 290 of FIG. 4).

Scenarios that use each of these branches A, B and AB, are described in what follows.

Figure 8:
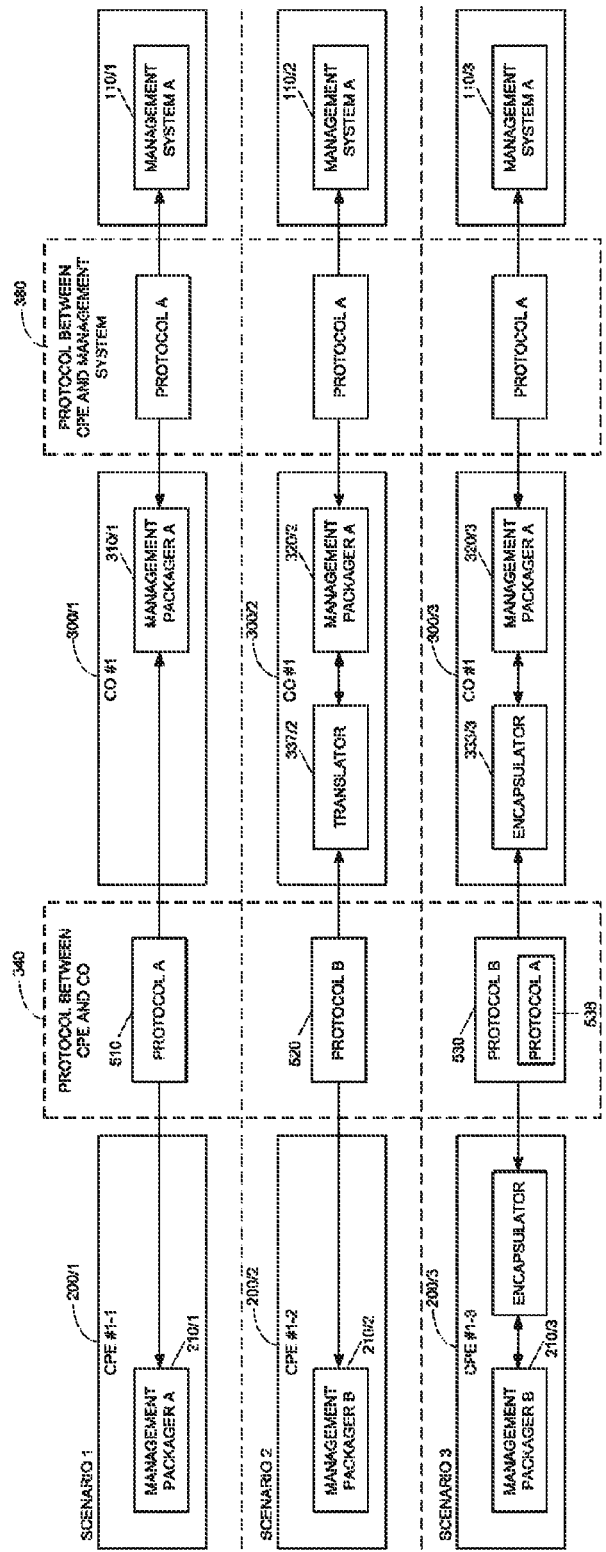
FIG. 8 is a simplified data flow of three scenarios of use of the method of FIG. 7, in accordance with an embodiment of the present invention.

Reference is made to FIG. 8, which is a simplified data flow of three scenarios of use of the method 1000, in accordance with an embodiment of the present invention. In a first example scenario, shown at the top of FIG. 8, protocol A is used for messaging between the management system and the CO, and for messaging between the CO and the destination CPE. Specifically, management system A (element 110/1 of FIG. 8) forwards a management control message to CPE #1-1 (element 200/1 of FIG. 8) via CO #1 (element 300/1 of FIG. 8). Management packager A (element 310/1 of FIG. 8) in CO #1 receives the management message (operation 1010 of FIG. 7), and performs a message forwarding procedure in accordance with method 1000 of FIG. 7 to process the message appropriately. At operation 1020 the procedure looks up CPE #1-1 in CPE management protocol control table 400 of FIG. 5, and identifies the type 420 of CPE #1-1 as being "A", and identifies the management protocol forwarding rule 430 of CPE #1-1 as being "Forward Protocol A". At operation 1030 the procedure branches to the "A" branch, which leads to operation 1040. At operation 1040 the procedure forwards the message to CPE #1-1 to its hardware resource (element 260 of FIG. 4). The format of the packet corresponds to frame 510 in FIG. 6. Flag 515 of frame 510 is set to "NATIVE", which corresponds to use of protocol A.

The protocol identifier that is defined as part of a standardized control protocol format, such as IEEE P1904.1 or ITU-T G.984, may be used as the flag with a "NATIVE" setting, without inserting the flag into protocol A header 513, for cases where the CPE only supports such protocol.

In a second example scenario, shown in the middle of FIG. 8, protocol A is used for messaging between the management system and the CO, and protocol B is used for messaging between the CO and the destination CPE. Management system A (element 110/2 of FIG. 8) forwards a management control message to CPE #1-2 (element 200/2 of FIG. 8) via CO #1 (element 300/2 of FIG. 8). Management packager A (element 310/2 of FIG. 8) in CO #1 receives the management message (operation 1010 of FIG. 7), and performs a message forwarding procedure in accordance with the method of FIG. 7 to process the message. At operation 1020 the procedure looks up CPE #1-2 in CPE management protocol control table 400 of FIG. 5, and identifies the type 420 of CPE #1-2 as being "B", and identifies the management protocol forwarding rule 430 of CPE #1-2 as being "Translate protocol A to protocol B". At operation 1030 the procedure branches to the "B" branch, which leads to operation 1070, where the procedure branches further to operation 1080. At operation 1080 the message is forwarded to a translator (element 337/2 of FIG. 8), which translates protocol A to protocol B while maintaining the context. In accordance with an embodiment of the present invention, the translator is operative to use designated rules based on correspondence of actions and parameters in protocols A and B. The rule is generally telecommunication system and network operator specific, and is configured in accordance with a network operator's setting. The format of the packet corresponds to frame 520 in FIG. 6. Flag 525 of frame 520 is set to "TRANSLATED", which corresponds to translation of protocol A to protocol B.

If, at operation 1070, a received protocol A message does not have a corresponding protocol B message to translate, then the received message is discarded at operation 1090.

The protocol identifier that is defined as part of a standardized control protocol format, such as IEEE P1904.1 or ITU-T G.984, may be used as the flag with a "TRANSLATED" setting, without inserting the flag into protocol A header 513, for cases where the CPE only supports such protocol.

In a third example scenario, shown at the bottom of FIG. 8, protocol A is used for messaging between the management system and the CO, and protocol B is used for messaging between the CO and the destination CPE. However, although protocol B is used for messaging between the CO and the destination CPE, the management control message is addressed to a management packager A in the destination CPE. The CPE may include, for example, two management packagers, A and B.

Figure 9:
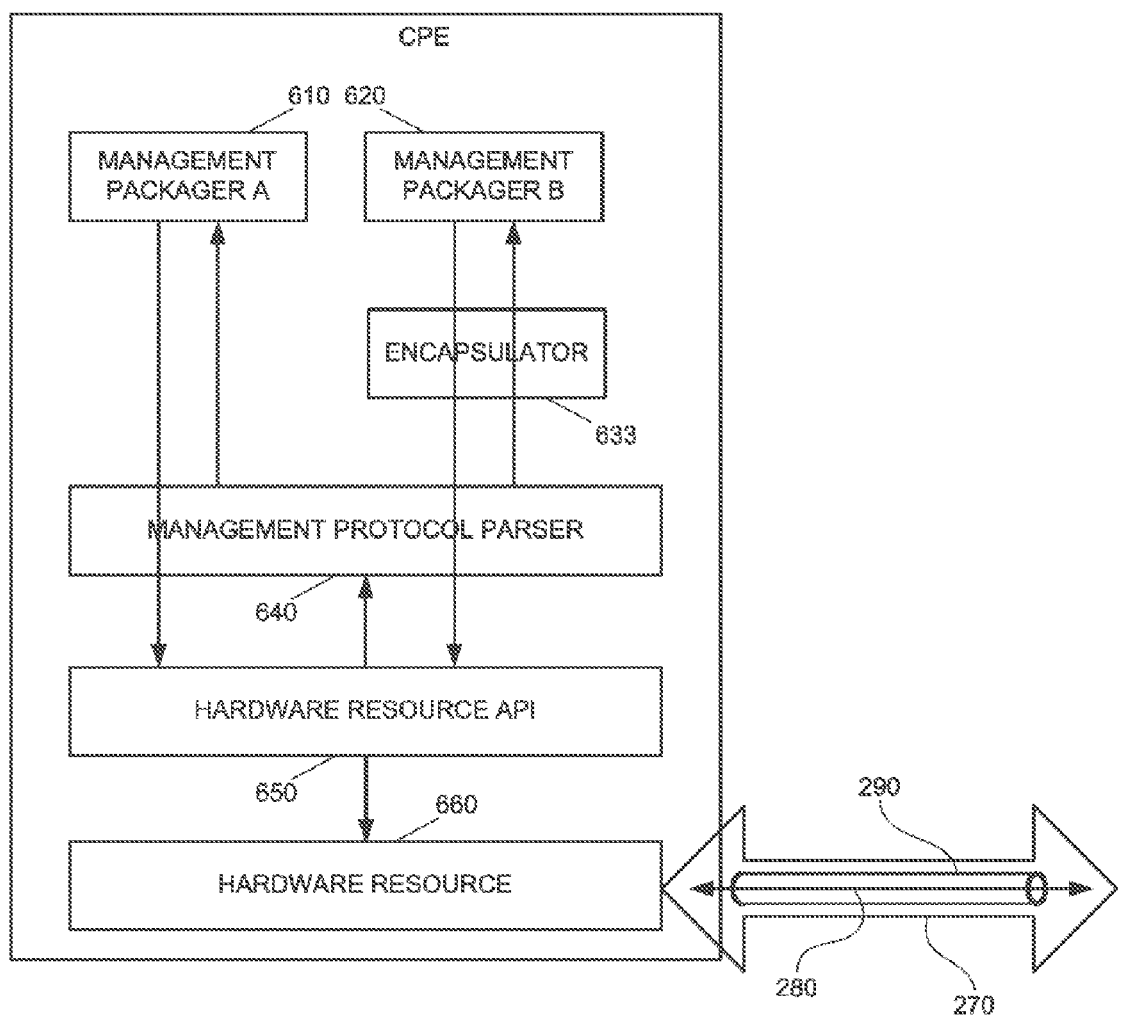
FIG. 9 is a simplified block diagram of a CPE, with two management packagers, that uses a management control parser, in accordance with an embodiment of the present invention.

Reference is made to FIG. 9, which is a simplified block diagram of a CPE 600, with two management packagers 610 and 620, that uses a management control parser 640, in accordance with an embodiment of the present invention. CPE 600 may have multiple CPUs each running with different management protocols. For example, one CPU may use a standard management protocol for access systems, such as the protocol defined in IEEE P1904.1, Service Interoperable Ethernet PON (SIEPON) or the protocol defined in ITU-T G.984, Gigabit PON; another CPU may use a management protocol such as OpenFlow; and CPE 600 uses a single protocol for communication between CPE 600 and the CO. When CPE 600 receives a management control message, management control parser 640 invokes a procedure that uses a method to determine how to forward a received management control message.

Figure 10:
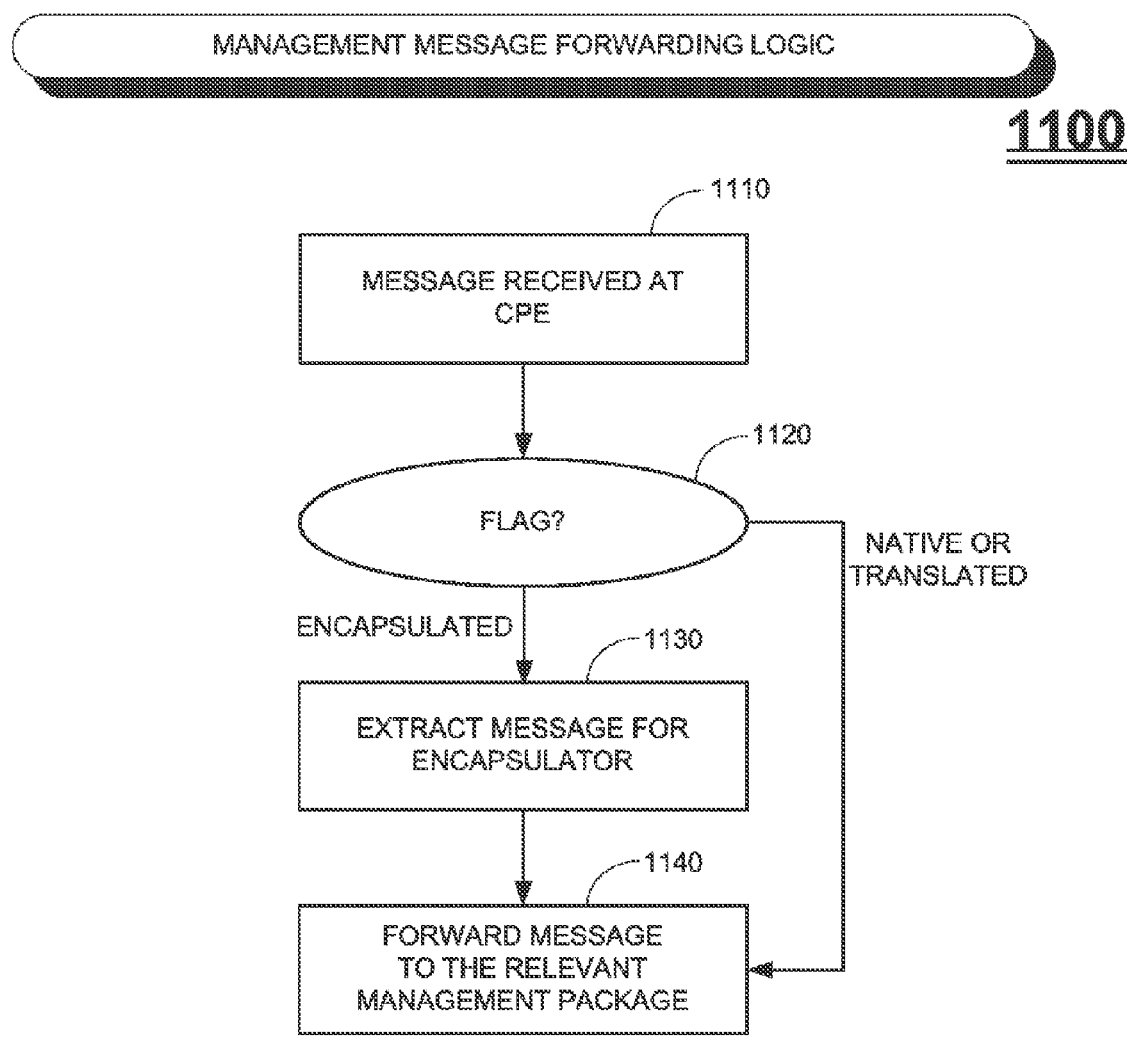
FIG. 10 is a simplified flowchart of a method used by the management control parser of FIG. 9, to determine how to forward a received management control message, in accordance with an embodiment of the present invention.

Reference is made to FIG. 10, which is a simplified flowchart of a method 1100 used by management control parser 640 to determine how to forward a received management control message, in accordance with an embodiment of the present invention. At operation 1110, management control parser 640 receives a management control message, packaged within a data frame (elements 510, 520 and 530 of FIG. 6). At operation 1120 the method branches depending on the flag (elements 515, 525, 535 of FIG. 6) setting in the received data frame. If the flag setting is "ENCAPSULATED", then at operation 1130 the received message is passed to an encapsulator (element 633 of FIG. 9). The encapsulator decapsulates a protocol A message (element 538 of FIG. 8) from the received message. Thereafter, at operation 1140 the decapsulated message is forwarded to management packager A (element 610 of FIG. 9). Otherwise, if the flag is "NATIVE" or "TRANSLATED", then the method branches at operation 1120 directly to operation 1140 where the received message is forwarded to management packager B (element 620 of FIG. 9), without additional processing.

Referring back to FIG. 8, in the third example scenario management system A (element 110/3 of FIG. 8) forwards a management control message to CPE #1-3 (element 200/3 of FIG. 8). Management packager A (element 320/3 of FIG. 8) in CO #1 receives the management message (operation 1010 of FIG. 7), and performs a message forwarding procedure in accordance with the method of FIG. 7 to process the message. At operation 1020 the procedure looks up CPE #1-3 in CPE management protocol control table 400 of FIG. 5, and identifies the type 420 of CPE #1-3 as being "AB", which means that CPE #1-3 supports management protocol A in one CPU in the CPE, but the CPE only supports management protocol B for communication between CPE #1-3 and the CO. Also at operation 1020, the procedure identifies the management protocol forwarding rule 430 of CPE #1-3 as being "Encapsulate protocol A in protocol B". Encapsulation avoids unnecessary translation, and preserves the original message sent from management system A. At operation 1030 the procedure branches to the "AB" branch, which leads to operation 1050. At operation 1050 a decision is made whether to encapsulate the message within protocol B, or whether to forward the message in its native protocol. This decision may be based, inter alia, on the protocols used with previous messages, or by a default setting of the system or of the CPE. If the decision at operation 1050 is to encapsulate the message ("YES"), then the method branches to operation 1060. At operation 1060 the message is forwarded to an encapsulator (element 333/3 of FIG. 8), which encapsulates protocol A in protocol B. The format of the packet corresponds to frame 530 in FIG. 6. Flag 535 of frame 530 is set to "ENCAPSULATED", which corresponds to encapsulation of protocol A in protocol B. In this case, the protocol data B segment of frame 530 actually carries protocol header A and protocol data A. If instead the decision at operation 1050 is to forward the message in its native protocol ("NO"), then the method branches to operation 1040, in which case the message is forwarded to the CPE in its native form, within a packet that corresponds to frame 510 in FIG. 6.

The three example scenarios shown in FIG. 8 relate to messages transmitted from management system A. Analogous examples apply to messages transmitted from management system B to (i) a CPE of type B, (i) a CPE of type A, and (iii) a CPE of type AB, respectively. In total, for the case of two management protocols there are eight scenarios, summarized in TABLE I below.

TABLE I

Message Forwarding Scenarios

| CPE Type | Destination CPE Packager | Source Management System | Flag |
|---|---|---|---|
| A | A | A | NATIVE |
| A | A | B | TRANSLATED |
| B | B | A | TRANSLATED |
| B | B | B | NATIVE |
| AB | A | A | NATIVE |
| AB | A | B | ENCAPSULATED |
| AB | B | A | ENCAPSULATED |
| AB | B | B | NATIVE |

As such, it will thus be appreciated by those skilled in the art that the present invention enables heterogeneous management, wherein plural management systems using plural management protocols send control messages over an access network to a CPE in a telecommunication node. In turn, this enables seamless upgrading of existing management systems to SDN-based management systems, by accommodating both an existing management protocol and an SDN-based management protocol.

Processing Replies

In request-response control systems, a CPE (element 136 of FIG. 1) receiving a management control message via a CO (element 132 of FIG. 1) sends a reply message via the CO to the management system that sent the control message. In addition, autonomous messages may also be sent from a CPE via a CO to a management system, such messages being notifications of event and status changes. Referring back to TABLE I above, for the case of two management protocols there are eight possible scenarios. In order for CPE 200 to properly generate a reply to a request message, management packager A (element 210 of FIG. 2) of CPE 200 saves the flag value (elements 515, 525, 535 of FIG. 5) of the data frame with the request message, and sets the same flag value in the data frame for the reply. In order for CPE 600, with two management packagers A and B, to properly generate a reply, the flag set by management packager A for a reply to a message received from management system A will be either "NATIVE" or "ENCAPSULATED", and the flag set by management packager B for the reply will be "TRANSLATED". The reply is sent from the CPE to the CO.

In this regard it is noted that translator 337 (FIGS. 3 and 4) is bi-directional, and translates "southbound" and "northbound" messages oppositely from one protocol to another, as necessary. The term "southbound" refers to communication to a lower layer facility, e.g., from a management system to a CPE, and the term "northbound" refers for communication to a higher layer facility, e.g., from a CPE to a management system.

Figure 11:
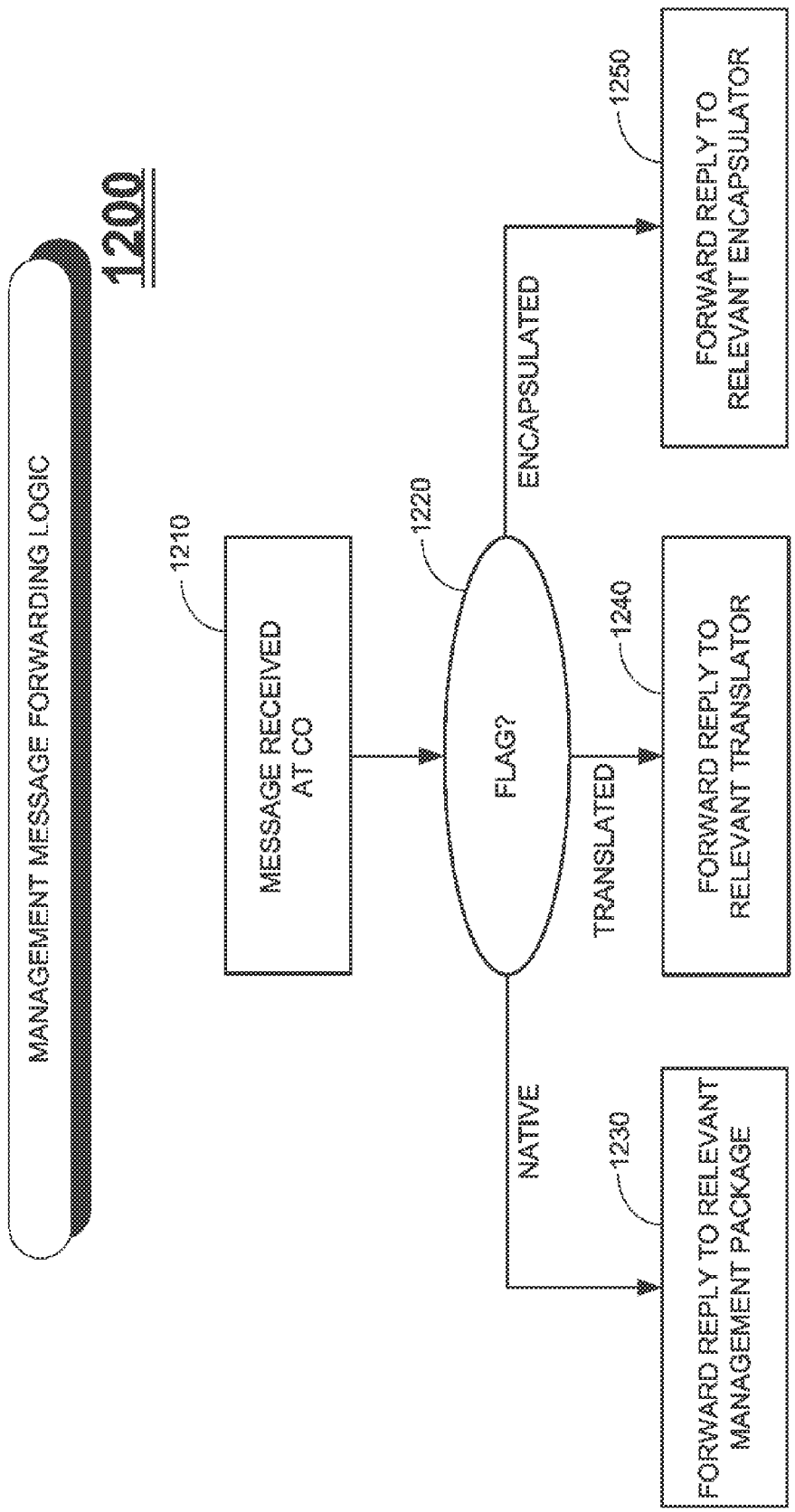
FIG. 11 is a simplified flowchart of a method used by the management control parser of FIG. 3 to determine how to forward a reply message, in accordance with an embodiment of the present invention.

Reference is made to FIG. 11, which is a simplified flowchart of a method 1200 used by management control protocol parser 340 to determine how to forward a reply message to management system A, in accordance with an embodiment of the present invention. At operation 1210 management protocol parser 340 receives a reply message from a CPE, the reply being packaged within a data frame (elements 510, 520, 530 of FIG. 6). At operation 1220 the method branches depending on the setting of the flag in the data frame (elements 515, 525, 535 of FIG. 6). If the flag is set to "NATIVE", then at operation 1230 management protocol parser 340 forwards the message to management packager A (element 310 of FIG. 3). If the flag is set to "TRANSLATED", then at operation 1240 management protocol parser 340 forwards the message to a translator (element 337 of FIG. 3). In this regard it is noted that a CPE may set the data frame flag to "TRANSLATED" for an autonomously generated message, when the CPE intends the message to be used by management system A (element 120 of FIG. 1). If the flag is set to "ENCAPSULATED", then at operation 1250 management protocol parser 340 forwards the reply message to an encapsulator (element 333 of FIG. 3). The encapsulator decapsulates the protocol A message (element 538 of FIG. 8) from the reply message. The decapsulated message is then forwarded to management packager A (element 320 of FIG. 3).

When the CPE and the CO use a single protocol for messaging then, for the case of "NATIVE" and "TRANSLATED", the protocol identifier that is defined as part of a standardized control protocol format, such as IEEE P1904.1 or ITU-T G.984, may be used as the flag with "NATIVE" and "TRANSLATED" setting, without inserting the flag into protocol A header 513, for cases where the CPE only supports such protocol.

Again, it will be appreciated by those skilled in the art that although the discussion above relates to a reply sent to management system A, an analogous method is used for a reply sent to management system B. When a management packager (elements 310 and 320 of FIG. 3) receives a reply that is formatted in the appropriate protocol, it processes the reply and sends it to the appropriate management system (elements 110 and 120 of FIG. 1).

Having read the above description, it will be appreciated by those skilled in the art that the present invention enables telecommunication operators to implement flexible management system and network device upgrade strategies in accordance with their business models.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for processing messages within a telecommunication network, comprising:
   receiving, by a central office (CO) computer within a telecommunication node from a network manager computer, a message packaged within a data frame conforming to a first protocol, denoted DF-PR1, the message being addressed to a customer premises equipment (CPE) computer within the telecommunication node, wherein the CO computer communicates with the network manager computer via an access network using the first protocol, and communicates with the CPE computer via a physical data link using a second protocol;
   determining, by the CO computer, whether or not the CPE computer to which the message is addressed supports the first protocol, based on a forwarding rule for the CPE computer to which the message is addressed, the forwarding rule comprising a conversion instruction to translate the message to the second protocol, or to encapsulate the message within a data frame conforming to the second protocol;
   when said determining is affirmative, then encapsulating, by the CO computer, the message conforming to the first protocol within a data frame that conforms to the second protocol, denoted DF-PR2;
   when said determining is not affirmative, then translating, by the CO computer, the message from the first protocol to the second protocol, and packaging the translated message within a data frame that conforms to the second protocol, also denoted DF-PR2;
   setting a conversion flag in the data frame DF-PR2 to indicate whether the message was translated to the second protocol, or encapsulated within the data frame DF-PR2, the conversion flag being for use by the CPE computer to which the message is addressed;
   sending, by the CO computer, the data frame DF-PR2 to the CPE computer via the physical data link;
   further receiving, by the CO computer, a reply within another data frame conforming to the second protocol, denoted DF2-PR2 from the CPE computer, the message being addressed to the network manager computer;
   further determining, by the CO computer, whether or not the CPE computer from which the reply was received, supports the first protocol, comprising looking up, by the CO computer, the forwarding rule for the CPE computer from which the reply was received, within a table indexed by identifiers of a plurality of CPE computers;
   when said further determining is affirmative, then decapsulating, by the CO computer, a message conforming to the first protocol within the data frame DF2-PR2, and packaging the decapsulated message within another data frame that conforms to the first protocol, denoted DF2-PR1;
   when said further determining is not affirmative, then translating, by the CO computer, the message from the second protocol to the first protocol within a another data frame that conforms to the first protocol, also denoted DF2-PR1; and
   further sending, by the CO computer, the data frame DR2-PR1 to the network manager computer via the access network.

2. The method of claim 1 wherein said determining comprises looking up the forwarding rule for the CPE computer to which the message is addressed, within a table indexed by identifiers of a plurality of CPE computers.

3. The method of claim 1, wherein the first protocol or the second protocol or both protocols, are members of the group consisting of (i) a Service Interoperable Ethernet passive optical network (SIEPON) protocol, (ii) a Gigabit Passive Optical Network protocol, and (iii) an OpenFlow protocol.

4. A method for processing messages within a telecommunication network, comprising:
   receiving, by a central office (CO) computer within a telecommunication node from a network manager computer, a message packaged within a data frame conforming to a first protocol, denoted DF-PR1, the message being addressed to a customer premises equipment (CPE) computer within the telecommunication node, wherein the CO computer communicates with the network manager computer via an access network using the first protocol, and communicates with the CPE computer via a physical data link using a second protocol;

determining, by the CO computer, whether or not the CPE computer to which the message is addressed supports the first protocol, based on a forwarding rule for the CPE computer to which the message is addressed, the forwarding rule comprising a conversion instruction to translate the message to the second protocol, or to encapsulate the message within a data frame conforming to the second protocol;

when said determining is affirmative, then encapsulating, by the CO computer, the message conforming to the first protocol within a data frame that conforms to the second protocol, denoted DF-PR2;

when said determining is not affirmative, then translating, by the CO computer, the message from the first protocol to the second protocol, and packaging the translated message within a data frame that conforms to the second protocol, also denoted DF-PR2;

setting a conversion flag in the data frame DF-PR2 to indicate whether the message was translated to the second protocol, or encapsulated within the data frame DF-PR2, the conversion flag being for use by the CPE computer to which the message is addressed;

sending, by the CO computer, the data frame DF-PR2 to the CPE computer via the physical data link;

further receiving, by the CO computer, a reply within another data frame conforming to the second protocol, denoted DF2-PR2 from the CPE computer, the message being addressed to the network manager computer, wherein DF2-PR2 comprises a conversion flag that is set to the same setting as the conversion flag in the data frame DF-PR2, and wherein said further determining is based on the setting of the conversion flag;

further determining, by the CO computer, whether or not the CPE computer from which the reply was received, supports the first protocol;

when said further determining is affirmative, then decapsulating, by the CO computer, a message conforming to the first protocol within the data frame DF2-PR2, and packaging the decapsulated message within another data frame that conforms to the first protocol, denoted DF2-PR1;

when said further determining is not affirmative, then translating, by the CO computer, the message from the second protocol to the first protocol within a another data frame that conforms to the first protocol, also denoted DF2-PR1; and further sending, by the CO computer, the data frame DR2-PR1 to the network manager computer via the access network.

5. The method of claim 4 wherein said determining comprises looking up the forwarding rule for the CPE computer to which the message is addressed, within a table indexed by identifiers of a plurality of CPE computers.

6. The method of claim 4, wherein the first protocol or the second protocol or both protocols, are members of the group consisting of (i) a Service Interoperable Ethernet passive optical network (SIEPON) protocol, (ii) a Gigabit Passive Optical Network protocol, and (iii) an OpenFlow protocol.

* * * * *